(12) United States Patent
Mahajan et al.

(10) Patent No.: US 10,354,193 B2
(45) Date of Patent: Jul. 16, 2019

(54) RUN-TIME IMAGE DISPLAY ON A DEVICE

(71) Applicant: INTEL CORPORATION, Santa Clara, CA (US)

(72) Inventors: Ayeshwarya Mahajan, Bangalore (IN); Ramesh Pendakur, Gaston, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/683,377

(22) Filed: Aug. 22, 2017

(65) Prior Publication Data

US 2017/0351960 A1  Dec. 7, 2017

Related U.S. Application Data

(63) Continuation of application No. 14/498,506, filed on Sep. 26, 2014.

(30) Foreign Application Priority Data

Sep. 27, 2013 (IN) .............................. 4381/CHE/2013

(51) Int. Cl.
| | | |
|---|---|---|
| *G06F 3/02* | (2006.01) | |
| *G06N 5/04* | (2006.01) | |
| *G06F 3/023* | (2006.01) | |
| *G06F 21/00* | (2013.01) | |
| *G06F 17/27* | (2006.01) | |
| *G06F 21/83* | (2013.01) | |
| *G06F 21/84* | (2013.01) | |

(52) U.S. Cl.
CPC ............... *G06N 5/04* (2013.01); *G06F 3/021* (2013.01); *G06F 3/0219* (2013.01); *G06F 3/0237* (2013.01); *G06F 3/0238* (2013.01); *G06F 17/276* (2013.01); *G06F 21/00* (2013.01); *G06F 21/83* (2013.01); *G06F 21/84* (2013.01); *H01H 2219/002* (2013.01); *Y04S 40/24* (2013.01)

(58) Field of Classification Search
CPC combination set(s) only.
See application file for complete search history.

(56) References Cited

U.S. PATENT DOCUMENTS

| | | |
|---|---|---|
| 4,188,626 A | 2/1980 | Frantz et al. |
| 5,287,526 A | 2/1994 | Wolf et al. |
| 7,339,583 B2 | 3/2008 | Mihara et al. |
| 2004/0070620 A1 | 4/2004 | Fujisawa |
| 2007/0288247 A1 | 12/2007 | Mackay |
| 2008/0074294 A1 | 3/2008 | Lin et al. |
| 2008/0303793 A1 | 12/2008 | Carroll |
| 2009/0207138 A1 | 8/2009 | Thorn |
| 2012/0151413 A1 | 6/2012 | Nurmi et al. |
| 2013/0073081 A1 | 3/2013 | Zhang et al. |
| 2013/0222371 A1 | 8/2013 | Reitan |
| 2013/0226758 A1 | 8/2013 | Reitan |
| 2013/0307786 A1 | 11/2013 | Heubel |

*Primary Examiner* — Van N Chow
(74) *Attorney, Agent, or Firm* — International IP Law Group, P.L.L.C.

(57) ABSTRACT

An embodiment for a computing device is described herein. The computing device may include a word database enhancer, a recommendation engine, a keyboard monitor, a ranking and display manager, and a keyboard. The keyboard may be a configurable physical keyboard device that includes an embedded display, where the embedded display is a runtime configurable display. The keyboard may display configurable images in the form of auto-text completion text or a decrypted password. The keyboard may also include a microcontroller, a touch sensor, and a keyboard filter driver.

12 Claims, 8 Drawing Sheets

RUN-TIME IMAGE DISPLAY ON A DEVICE

CROSS-REFERENCE TO RELATED APPLICATION

This application is a continuation of U.S. patent application Ser. No. 14/498,506, filed on Sep. 26, 2014, titled "RUN-TIME IMAGE DISPLAY ON A DEVICE," which claims the benefit of an India Provisional Application No. 4381/CHE/2013 filed Sep. 27, 2013.

TECHNICAL FIELD

The present disclosure generally relates to creating and assigning runtime created images. In particular, the present techniques relate to displaying runtime created images on a key cap of a keyboard and selecting the runtime created image. The runtime images may be in the form of auto-complete text or decrypted passwords.

BACKGROUND ART

Less sophisticated personal computer (PC) users may encounter issues such as lack of character recognition and lack of data entry skills, when utilizing a keyboard. For example, showing auto-complete recommendations on a main screen may be useful when the PC user is focusing on the main screen while typing. However, a PC user who cannot type without viewing the keyboard may become frustrated since the user has to switch their attention back and forth to view both the keyboard and the main screen. As a result, the PC user may often miss the auto-complete recommendation on the screen.

DESCRIPTION OF THE EMBODIMENTS

The present techniques relate to enabling key caps on a keyboard with matrix display, touch sensors, and runtime software programmable methods to create and assign a runtime created image on the key caps that can be viewed and selected by a user. Additionally, the techniques relate to a method of selecting the runtime created image. In operation, the techniques include combining the technologies of display based and positioned graphics within key caps to create customized key caps tailored to lessen user frustrations and to provide a more pleasurable keyboard experience for the user.

In embodiments, the present techniques may include an auto-completion recommendation directly on a key cap instead of directly on a display screen so that a user may select a recommended word while both typing on and viewing the keyboard. Additionally, the keyboard may include an embedded screen so that a user can see what is being typed while looking down at the keyboard. In embodiments, the space bar key or other surface of the keyboard includes a display that outputs a predicted word as the user is typing. Also, in embodiments the present techniques may include decoupling the layers of a keyboard so that a user may utilize simple-to-remember passwords with the ability to view images of the passwords on a key of the keyboard.

Figure 1:
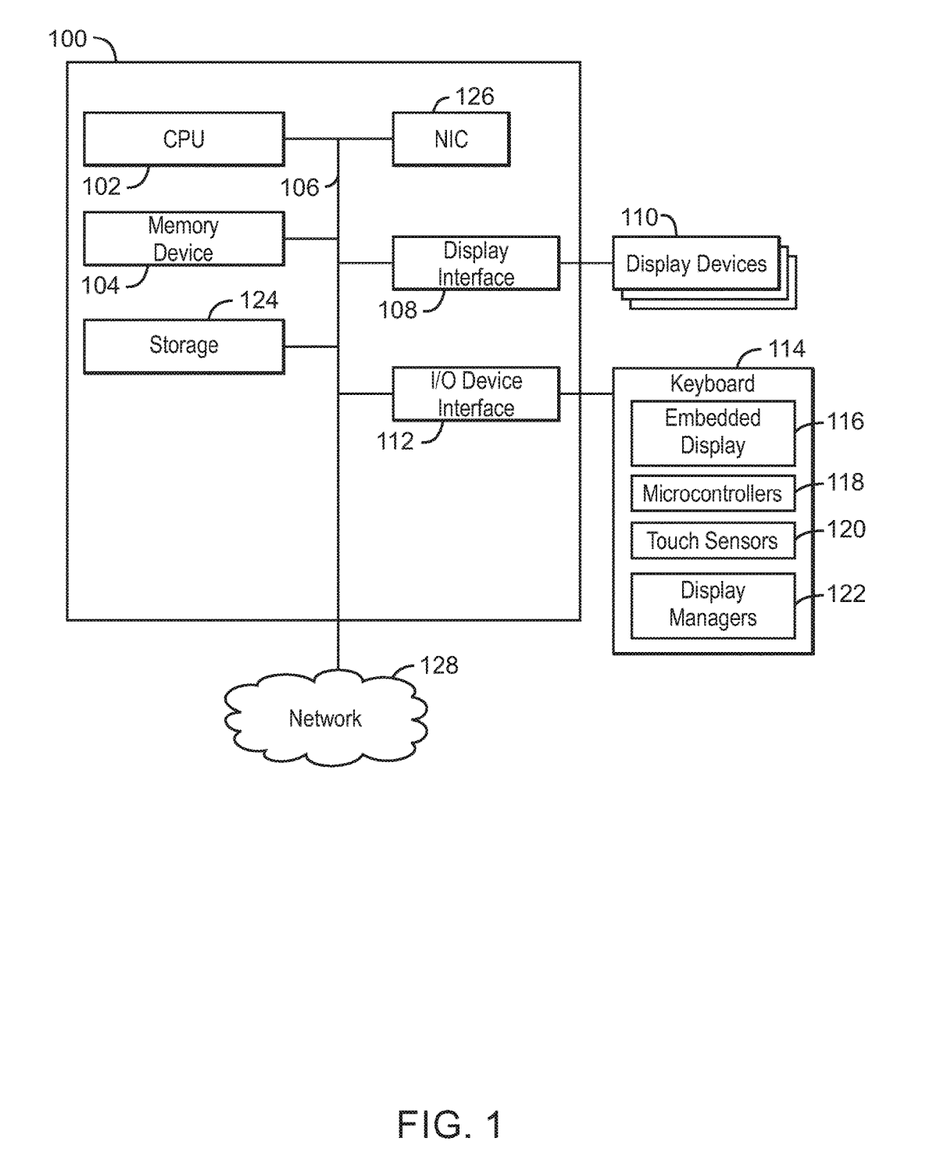
FIG. 1 is a block diagram of a computing device that displays a runtime configurable display on a keyboard.

FIG. 1 is a block diagram of a computing device 100 that displays a runtime configurable display on a keyboard. The computing device 100 may be, for example, a laptop computer, desktop computer, ultrabook, tablet computer, mobile device, or server, among others. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. The CPU may include a cache. Furthermore, the computing device 100 may include more than one CPU 102.

The memory device 104 can include random access memory (RAM), read only memory (ROM), flash memory, or any other suitable memory systems. For example, the memory device 104 may include dynamic random access memory (DRAM). The CPU 102 may be linked through the bus 106 to a display interface 108 configured to connect the computing device 100 to display devices 110. The display devices 110 may include a display screen that is a built-in component of the computing device 100. The display devices 110 may also include a computer monitor, television, or projector, among others, that is externally connected to the computing device 100.

The CPU 102 may also be connected through the bus 106 to an I/O device interface 112 configured to connect the computing device 100 to a keyboard 114. The keyboard 114 may be a configurable keyboard with graphic capabilities within each keycap of the keyboard 114. The keyboard 114 may include an embedded display 116, at least one microcontroller 118, a touch sensor 120, and a display manager 122, among other components. The embedded display 116 may be a runtime configurable display where runtime programmable software may be embedded within the keyboard 114. In particular, the runtime programmable software may be utilized to update the runtime configurable display of each keycap with an autocomplete engine. In some embodiments, the embedded display 116 may be an active matrix display to display autocomplete text recommendations from the autocomplete engine. The embedded display may show recommended word possibilities directly on the keyboard.

The microcontrollers 118 may include, but are not limited to, at least one keyboard microcontroller, at least one display controller, and at least one touch controller. In embodiments, the at least one display controller and the at least one touch controller are universal serial bus-human interface device (USB-HID) compliant microcontrollers. Thus, each of the at least one display controller and the at least one touch controller may be exposed to the operating system of the computing device 100 as a USB-HID compliant standard auxiliary display device with touch support. The touch sensor 120 may receive input when a user touches a particular key cap that includes the touch sensor. Although one touch sensor is illustrated, the keyboard 114 may include a plurality of touch sensors. As a user is typing, the text may be provided to a recommendation engine via a keyboard monitor module. Words can be recommended by the recommendation engine, which sends multiple recommended words to the display manager 122. The display manager 122 may rank, identify, and display the recommended words. The display manger may also identify the selection of the particular text selection from the recommended words application as a touch event on the computing device 100.

Other I/O devices may be included, such as a pointing device, wherein the pointing device may include a touchpad or a touchscreen, among others. The I/O devices may be built-in components of the computing device 100, or may be devices that are externally connected to the computing device 100.

The computing device 100 may include a storage device 124. The storage device 124 is a physical memory such as a hard drive, an optical drive, a thumbdrive, an array of drives, or any combinations thereof. The computing device 100 may also include a network interface controller (NIC) 126 configured to connect the computing device 100 through the bus 106 to a network 128. The network 128 may be a wide area network (WAN), local area network (LAN), or the Internet, among others.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
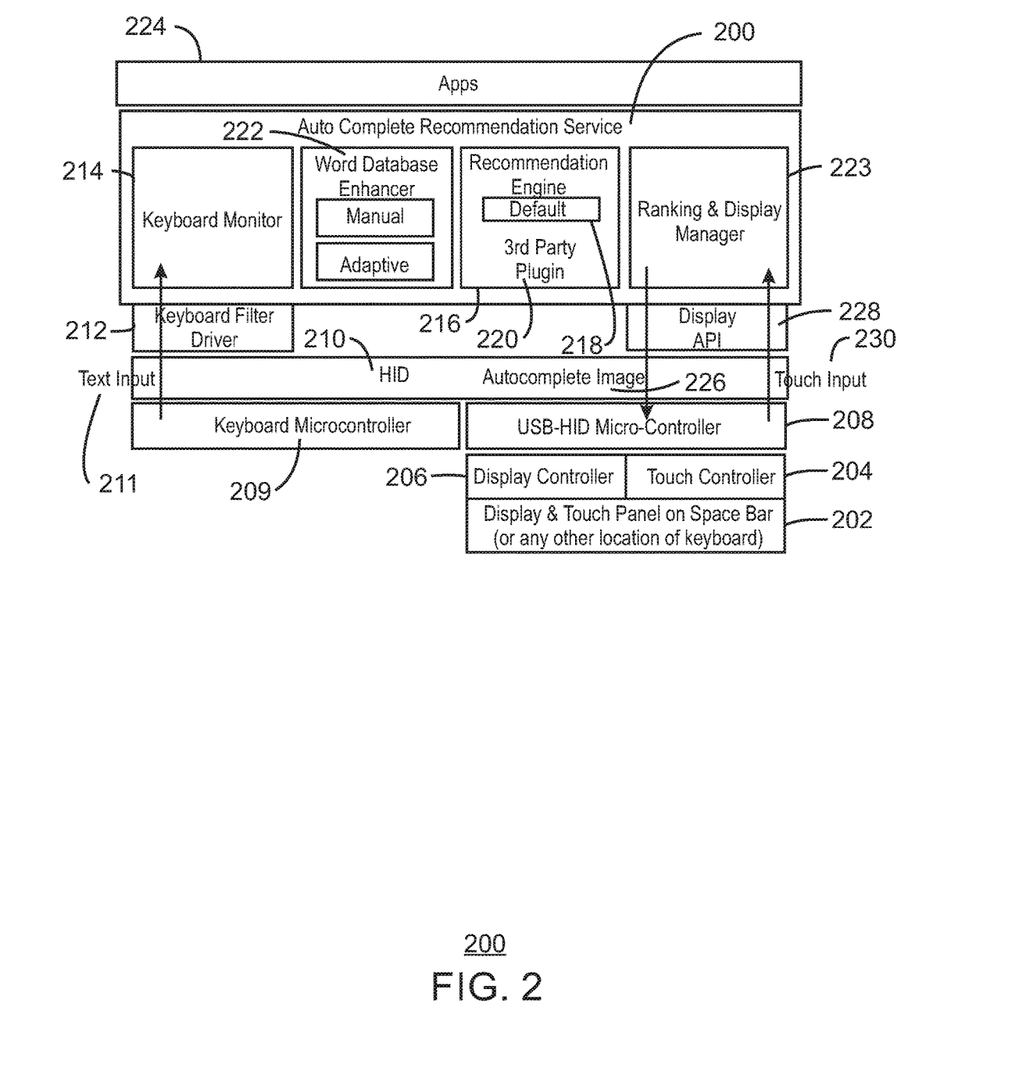
FIG. 2 is a block diagram for an auto-complete recommendation service.

FIG. 2 is a block diagram for an auto-complete recommendation service 200. As shown in FIG. 2, a display and touch panel 202 and its respective controllers 204, 206, and 208 may be exposed to an operating system as a universal serial bus-human interface device (USB-HID) display device. Although FIG. 2 illustrates a USB-HID interface, any I/O interface can be used. Moreover, although the display and touch panel 202 is illustrated as a component of a space bar key, any location of the keyboard may be used. In examples, the display and touch panel 202 is an active matrix display with a high pin connector, i.e., 40 pins, that is integrated on a large size keycap such as the space bar or on any other location of the keyboard. In particular, the display and touch panel 202 may be located on any key cap or any surface of the keyboard that is not a key cap, such as between rows of key caps or between columns of keycaps. The display and touch panel 202 may also be located on any edge of the keyboard, such as to the top, bottom, left, or right of any grouping of keys.

When a user types text input 211 onto key caps coupled with a microcontroller 209, a scan codes reported by an HID stack 210 can be intercepted by a keyboard filter driver 212 and provided to a keyboard monitor 214. As a result, runtime input text can be interpreted by a recommendation engine 216 which in turn may recommend one or more words to the auto-complete recommendation service 200. The recommendation engine 216 may also have a default engine 218 provided by a manufacturing entity and may provide a method to plug in third party recommendations 220 for better performance and multi-lingual support. A word database enhancer 222 within the auto-complete recommendation service 200 may add new words into the database used by the recommendation engine 216. The new words can be added using either of two methods including an user manual method or an adaptive method where a module intercepts the new words the user has inputted and adds any words to the database that do not currently exist.

Another component of the auto-complete recommendation service 200 may include the ranking and display manager 223, which can receive multiple words from the recommendation engine 216. In operation, the ranking and display manager 223 may rank and identify multiple options that can be accommodated in an available keycap space. The manager 222 may render the input text auto-complete image 226, e.g., runtime text input, of the user to memory and update the display and touch panel 202 using a display application programming interface (API) 226. Various words and text displayed may be displayed in the auto-complete image 226 on the keycap space and selected by the user. Accordingly, the key cap may display auto-complete recommendations to the user. As a result, the user does not have to switch between focusing on a computing device screen for viewing auto-complete recommendations and focusing on the keyboard while typing. Instead, the auto-complete recommendations can be viewed directly on the keyboard.

The selection of the user may be reported as a touch event 230 and interpreted by the manager 223 associated with the keyboard. The text selection can then be reported to one or several applications 224 that may be plugged into the auto-complete recommendation service 200.

In some embodiments, a password service may operate in a similar manner as the auto-complete recommendation service 200. However, instead of auto-complete text displayed on the keyboard, a user's encrypted and decrypted password may be displayed.

The block diagram of FIG. 2 is not intended to indicate that the auto-complete recommendation service 200 is to include all of the components shown in FIG. 2. Further, the auto-complete recommendation service 200 may include any number of additional components not shown in FIG. 2, depending on the details of the specific implementation.

Figure 3:
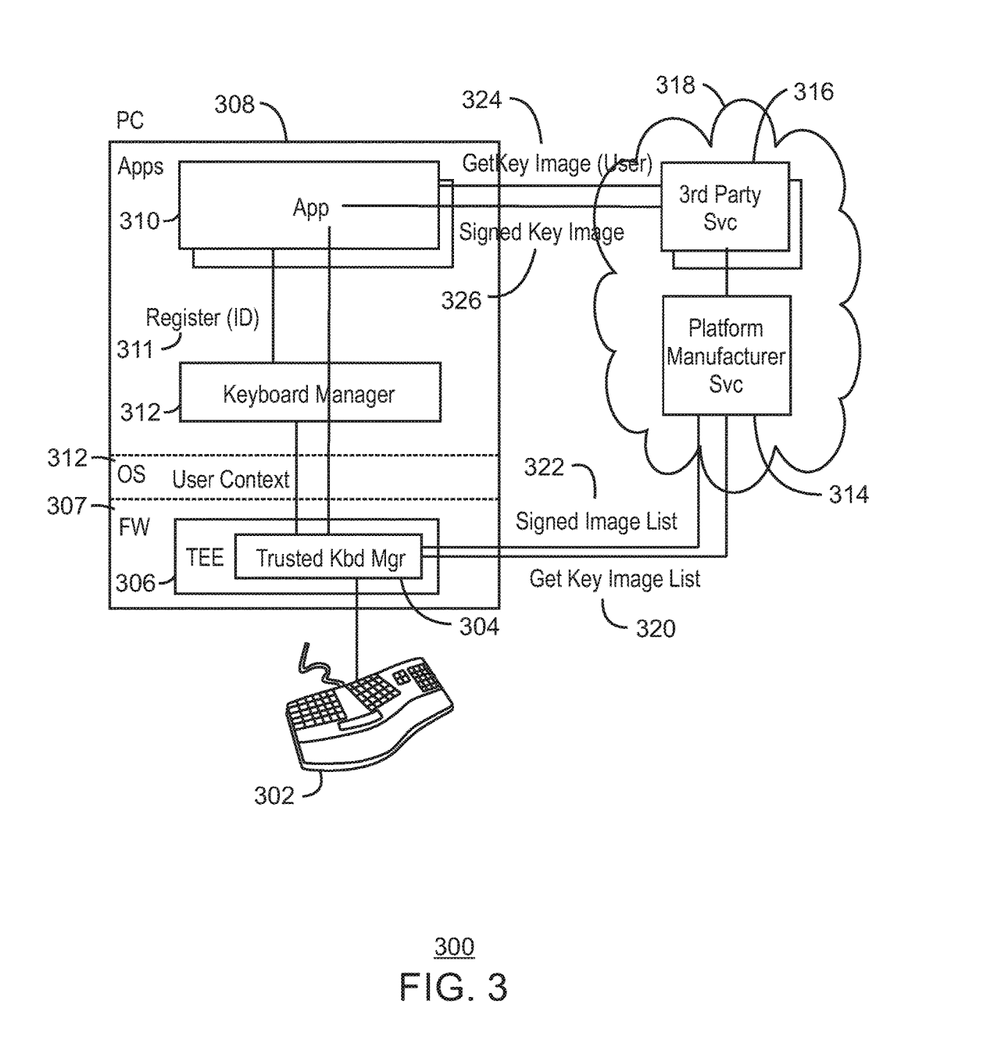
FIG. 3 is a block diagram of the architecture for the display of an image on a keycap on a keyboard.

FIG. 3 is a block diagram of the architecture 300 for the display of an image on a keycap on a keyboard. As discussed with respect to FIG. 2, various text and words, e.g., custom key images, may be display on the keycaps of a physical keyboard. As illustrated in FIG. 3, the architecture 300 may provide techniques to configure the keyboard 302 for the actual display of the custom key images. The keyboard 302 may be controlled by a Trusted Keyboard Manager (TKM) 304 that is running in a Trusted Execution Environment (TEE) platform 306. In embodiments, the TKM 304 and the TEE platform 306 are a portion of firmware 307. An operating system 309 may manage the system hardware and software resources, including the keyboard 302.

The TKM 304 may be primarily responsible for displaying a custom key image on the keyboard 302. On start-up of a PC device 308, the TKM 304 may have cached a set of generic images, e.g., runtime configurable display images, for display on the keycap of the keyboard 302. Thereafter, the TKM 304 may periodically consult with a platform manufacturer to obtain a list of additional images to display, including auto-complete recommendations or visible passwords. In embodiments, the TM 304 may consult with cloud services 318 such as a platform manufacturer cloud service 314 or a third party cloud service 316 to obtain the list of additional keys to display.

On startup or during execution of an application 310 belonging to partner service providers, the application 310 can consult with its own service provider to obtain a signed image for a custom key. The application can then register itself (as illustrated at reference number 311) with the Keyboard Manager 312 running in the Operating System 309 or at the application layer and deliver the signed key image to the TKM 304. Thus, during execution of an application 310, the application 310 may deliver the generic custom key image to the TKM 306 for display. The TKM 306 may validate each custom key image before it is displayed by determining its validity and eligibility for display on the keycaps. As illustrated in FIG. 3, a keyboard manager 312 may interface with the keyboard 302 to display the generic custom key images. In the case of a virtual keyboard, the keyboard manager 312 may overlay the custom key images on top of the virtual keyboard of an operating system and may intercept a touch event corresponding to the custom keycaps.

In embodiments, the TKM 304 can automatically request or "get" a key image list from the cloud services 318 as illustrated at reference number 320. A signed image list may be sent to the TKM 304 from the cloud services 318 as illustrated by reference number 322. Similarly, a user can request or "get" a key image from the cloud services 318 as illustrated at reference number 324. A signed key image may be sent to the app 310 from the cloud services 318 as illustrated by reference number 326.

Figure 4A:
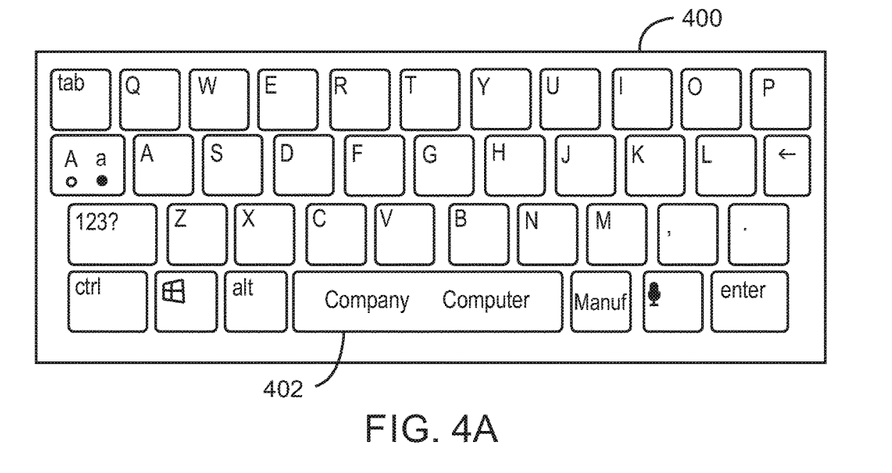
FIGS. 4A and 4B each illustrate displaying a runtime created image on a space bar of a keyboard and selecting the runtime created image on the keyboard.
Figure 4B:
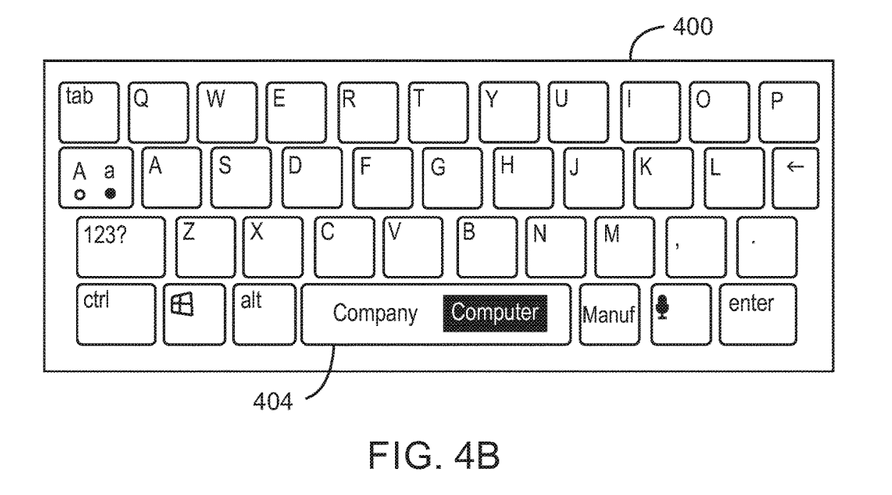

FIGS. 4A and 4B each illustrate displaying a runtime created image on a space bar of a keyboard 400 and selecting the runtime created image on the keyboard 400, respectively. As shown in FIG. 4A, a user may input text using the keyboard 400 that may then be interpreted by a recommendation engine, as previously discussed. The recommendation engine may provide one or more words, e.g., "Company" or "Computer," that may be closely related in spelling to the input text of the user. The recommended words are illustrated on the space bar at reference number 402. As shown in FIG. 4B, a custom key image may be displayed on a screen embedded in the keyboard 400. For example, based on the discretion of the user, the word "Computer" may be chosen by selecting the word on the space bar key with a touch, as shown on the space bar at reference number 404. As a result of the embedded screen within the keyboard, the user is provided with a visual depiction of auto-complete text and words without viewing the screen of the computing device.

Figure 5A:
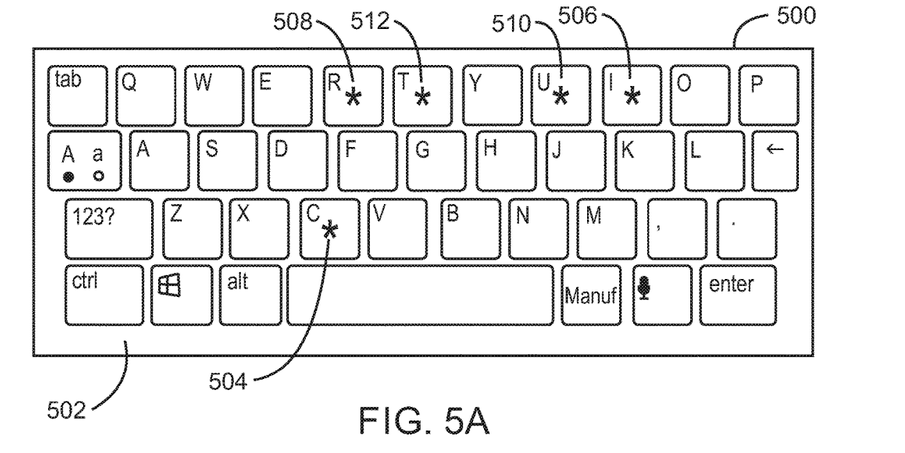
FIGS. 5A and 5B each illustrate a visual layer of a keyboard and a scan code layer of the keyboard.
Figure 5B:
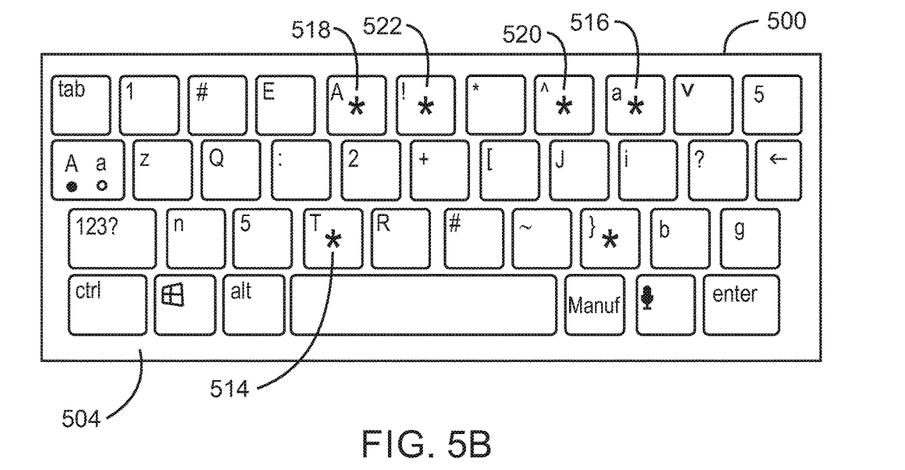

FIGS. 5A and 5B each illustrate a visual layer of a keyboard 500 and a scan code layer of the keyboard 500, respectively. As a line of defense, many information technology (IT) security protocols may discourage or prohibit the use of simple, non-complex user credentials, i.e., password, or periodic change of the password. Thus, to obtain a password, certain rules may govern the content of a user's credentials including a certain minimum length, the exclusion of certain words, the inclusion or exclusion of non-alphanumeric characters, among other criteria. However, complicated passwords can present the user with unconventional problems. If the user's password is intercepted for malicious use, the user may be exposed to a potential loss of credentials, which can be revoked but not replaced. Further, complicated passwords can often be difficult to remember especially when a user may be required to change passwords on a periodic basis.

A keyboard can be conceptualized as a two-layer device including a visual layer and a scan code layer. The visual layer may represent a character, a number, or a symbol displayed on a key to identify one key from another. The scan code layer may be the underlying value generated by the software and/or the hardware of a keyboard that can be sent to a computer to report which keys on the keyboard have been pressed. In typical keyboards, both layers may be statically coupled. As illustrated in FIGS. 5A and 5B, the two layers may be decoupled to provide a runtime configurable display. As shown in FIG. 5A, the visual layer of the keyboard may include a keyboard layout 502 that a user may actual view when typing a password. For example, the user may type the password "circuit" using the visual layer of the keyboard 500, as depicted by the asterisks in FIG. 5A. Specifically, the keys 504, 506, 508, 510, and 512 are used to spell the word "circuit." However, the password "circuit", when interpreted by the scan code layer, may actually use the characters "TaAT^a!", as depicted by the asterisks on a keyboard layout 504 to allow access to a device, as shown in FIG. 5B. The same keys on a different layer, specifically, the keys 514, 516, 518, 520, and 522, now output the characters "TaAT^a!". Thus, the randomized scan code layer can be generated at runtime based on the context information provided by the user.

Figure 6A:
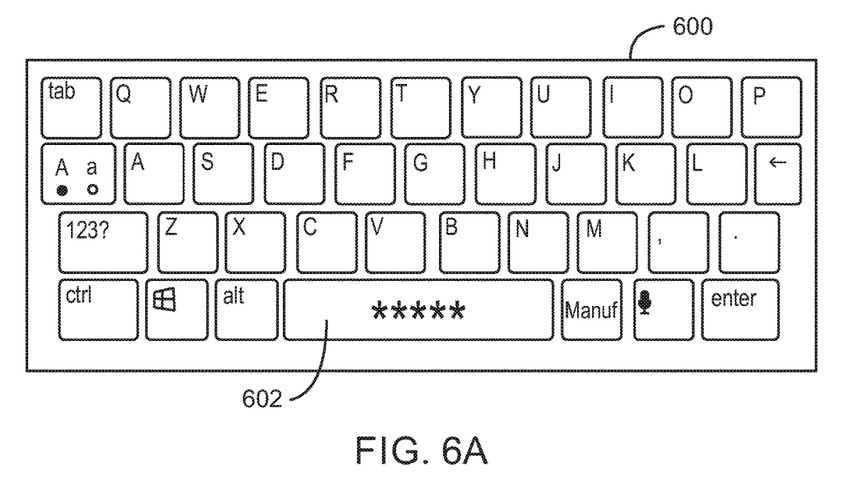
FIGS. 6A and 6B each illustrate displaying a hidden password as asterisks on a space bar of a keyboard and an actual display of the runtime created and decrypted image of the password on the keyboard.
Figure 6B:
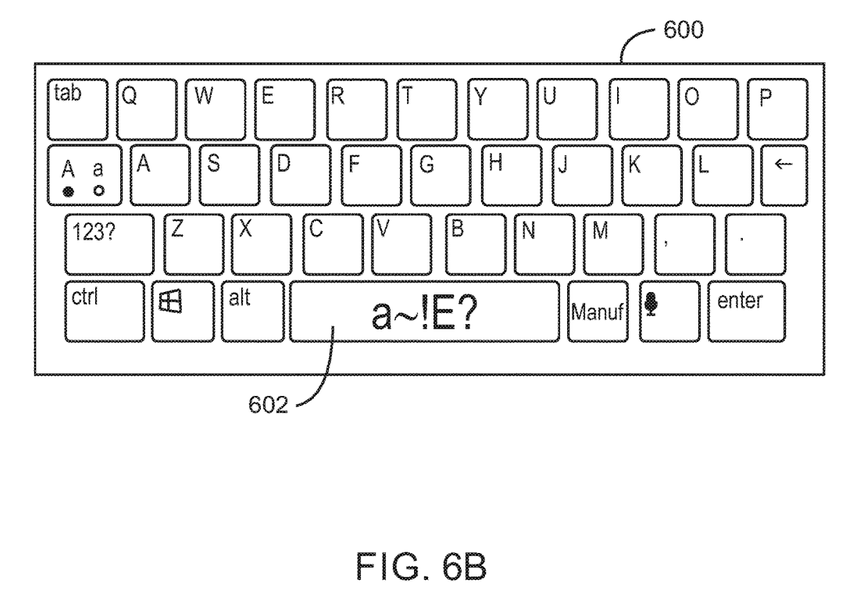

FIGS. 6A and 6B each illustrate displaying a hidden password as asterisks on a space bar of a keyboard 600 and an actual display of the runtime created and decrypted image of the password on the keyboard 600, respectively. As discussed with respect to FIGS. 5A and 5B, a user may input a password using a keyboard. However, a scan code layer of the keyboard may actually change the interpretation of the characters of the inputted password.

As shown in FIG. 6A, after the user has provided the input text to satisfy the password requirement, the space bar 602 of the keyboard 600 may provide a password entry indication using a series of asterisks, as illustrated in FIG. 6A. However, the user may desire to visually inspect the actual password without encryption. Thus, the user may press and hold the space bar 602 for about 2 to 3 seconds so that the actual password may be revealed on the space bar 602, as shown in FIG. 6B. As a result of the embedded screen within the keyboard, the user is provided with a visual display of the output associated with the password.

Figure 7:
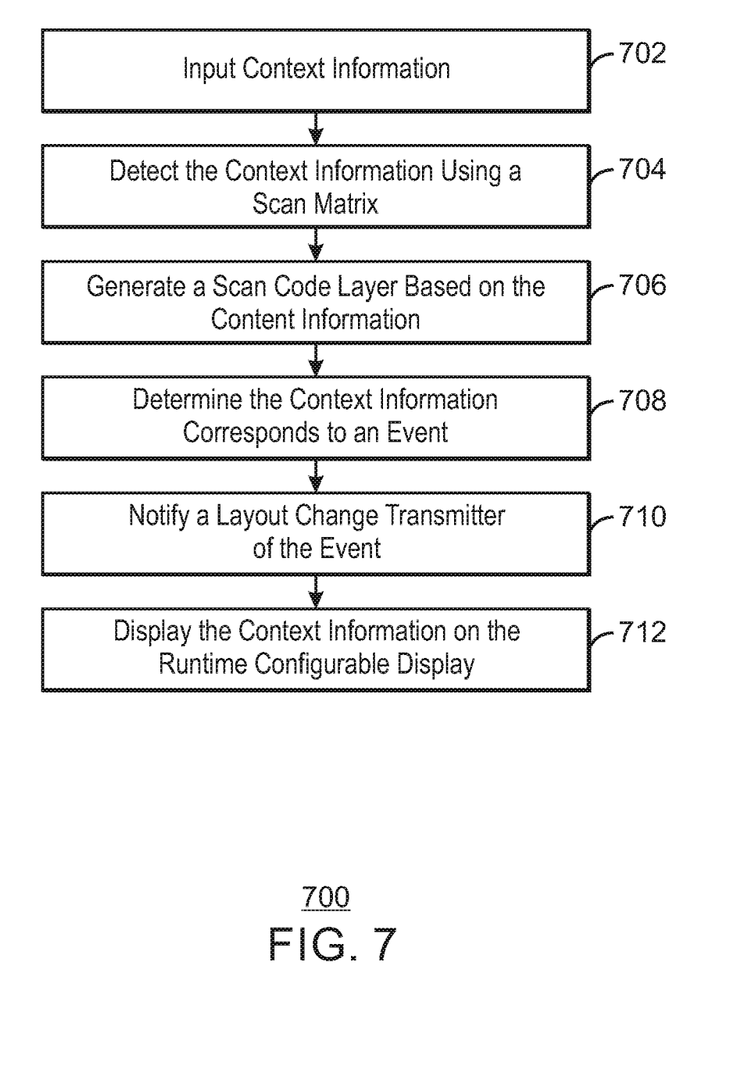
FIG. 7 is a process flow diagram of a method for displaying a runtime configurable display.

FIG. 7 is a process flow diagram of a method 700 for displaying a runtime configurable display. When a computing device is in system boot mode, a default table corresponding to a lower case alphabet layout may be assigned by a microcontroller. As a result, at block 702, a user may input context information into the computing device using a keyboard. The context information may include a user ID, website ID, password, platform ID, among other text. When the keycaps of the keyboard are pressed, the input of the user may be detected using a scan matrix, at block 704, and sent to a keyboard module. In some embodiments, the input may be detected using a coarse resistive or capacitive grid on a screen of the computing device.

At block 706, based on the context information, a code layer may be generated. The code layer may be a scan code layer. In some cases, the microcontroller maintains multiple keyboard scan code maps for individual keyboard layouts. At block 708, it is determined whether the context information corresponds to an event. In some aspects, the event may include a change of the keyboard module, for example, the decoupling of the visual code layer and the scan code layer. If the input of the context information corresponds to the event, then the active scan code map may be changed and notification of the event may be sent to a layout change transmitter module of the microcontroller, at block 710. In some embodiments, the scan code layer may be generated at runtime based on the context information. At block 712, the context information in the form of a runtime configurable display may be displayed on a keycap of a configurable keyboard. A report related to the runtime configurable display may be reported to an application running on the computing device.

The process flow diagram of FIG. 7 is not intended to indicate that that method 700 is to include all of the components shown in FIG. 7 in every case. Further, any number of additional components can be included within the method 700, depending on the details of the specific implementation.

Figure 8:
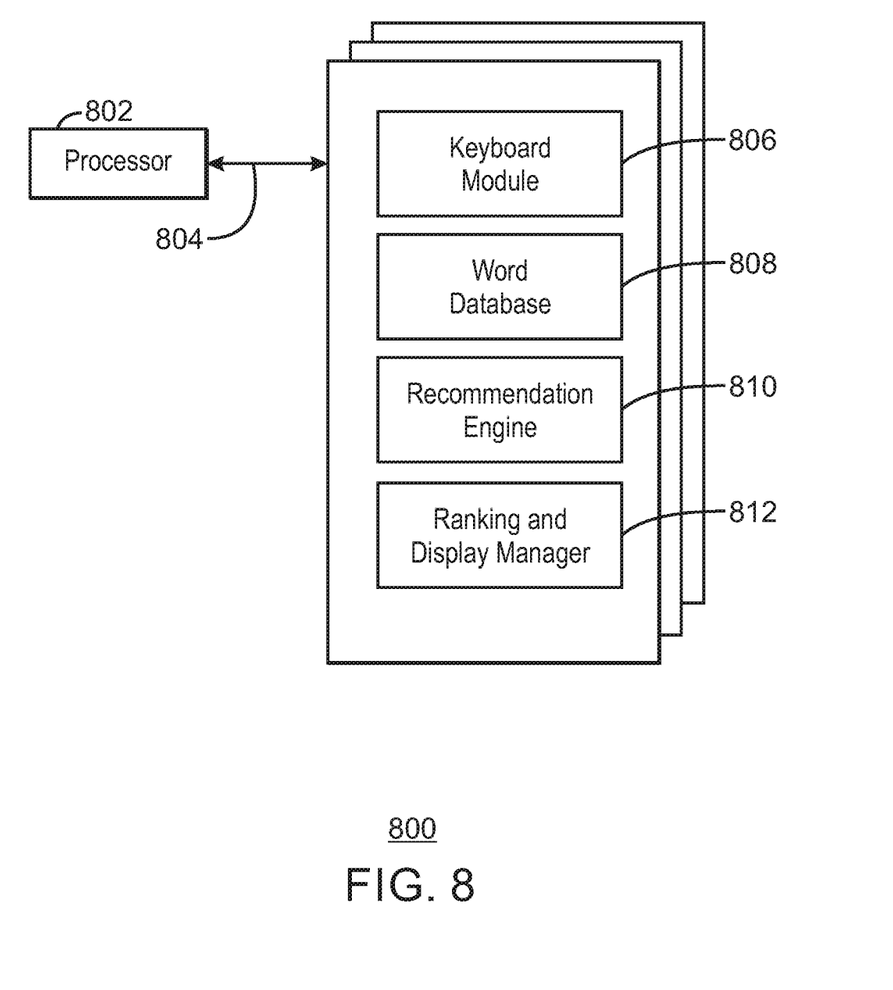
FIG. 8 is a block diagram showing a tangible, non-transitory, computer readable storage medium that stores code to display a runtime configurable display.

FIG. 8 is a block diagram showing a tangible, non-transitory, computer readable storage medium 800 that stores code to display a runtime configurable display. The tangible, non-transitory computer-readable medium 800 may be accessed by a processor 802 over a computer bus 804. Furthermore, the tangible, non-transitory computer-readable medium 800 may include code configured to direct the processor 802 to perform the method described herein.

The various software components discussed herein may be stored on one or more tangible, non-transitory medium 800, as indicated in FIG. 8. For example, a keyboard monitor module 806 may be configured as a gateway to accept the selection of the context information, e.g., runtime text or words. A word database module 808 made be configured to add new words into a database that is utilized by a recommendation engine module 810. For example, the new words may be added manually by a user. Additionally, new words may be added implicitly as the word database module 808 accepts new words inputted by the user. In addition to accepting words from the word database module 808, the recommendation engine module 810 may interpret runtime text input and recommend such input to auto-complete.

A ranking and display manager module 812 may receive the runtime text input and words from the recommendation engine module 810 and may identify word options to display on an embedded display of a keyboard. In some embodiments, the ranking and display manager module 812 may update the embedded display.

The block diagram of FIG. 8 is not intended to indicate that the tangible, non-transitory computer readable medium 800 is to include all of the components shown in FIG. 8. Further, the tangible, non-transitory, computer readable storage medium may include any number of additional components not shown in FIG. 8, depending on the details of the specific implementation. For example, the tangible, non-transitory, computer readable storage medium 800 may include components to perform a method 700 as illustrated in FIG. 7.

Example 1

A computing device is described herein. The computing device includes a word database enhancer, a recommendation engine, a keyboard monitor, a ranking and display manager; and a keyboard. The keyboard includes an embedded display, where the embedded display is a runtime configurable display. The keyboard also includes a microcontroller, a touch sensor, and a keyboard filter driver.

The computing device includes a database to supply words to the recommendation engine. The recommendation engine can interpret runtime text input and to recommend words to an auto-complete recommendation service. The ranking and display manager can receive words from the recommendation engine and identify word options to display on the embedded display of the keyboard. The ranking and display manager can update the embedded display. The embedded display may be an active matrix display to display the runtime text input. The embedded display can display autocomplete text recommendations. The microcontroller may include at least one keyboard microcontroller, at least one universal serial bus-human interface device (USB-HID) microcontroller, at least one display controller and at least one touch controller. The touch sensor can intercept a touch event. The display manager can identify text selection based on the touch event.

Example 2

A method for displaying a runtime configurable display is described herein. The method includes inputting context information, detecting the context information using a scan matrix, generating a code layer based on the context information, determining the context information corresponds to an event, notifying a layout change transmitter of the event, and displaying the context information on the runtime configurable display.

The method includes assigning a default table that corresponds to a lower case alphabet layout. The method includes sending the context information to a keyboard module. The event comprises a change of the keyboard module. The method includes changing an active scan code map. The active scan code map may change when the context information corresponds to the event. The change of the active scan code map may include decoupling a visual code layer and the scan code layer. The method includes generating a scan code layer at runtime based on the context information. The runtime configurable display may be located on a configurable keyboard. The method includes reporting the runtime configurable display to an application.

Example 3

A tangible, non-transitory, computer readable storage medium is described herein. The tangible, non-transitory, computer readable storage medium includes code to direct a processor to input context information, detect the context information using a scan matrix, generate a scan code layer based on the content information, determine the context information corresponds to an event, notify a layout change transmitter of the event, and display the context information on the runtime configurable display.

The tangible, non-transitory, computer readable storage medium includes code to direct the processor to assign a default table that corresponds to a lower case alphabet layout. The tangible, non-transitory, computer readable storage medium includes code to direct the processor to send the context information to a keyboard module. The event may include a change of the keyboard module. The tangible, non-transitory, computer readable storage medium includes code to change an active scan code map. The active scan code map may be changed when the context information corresponds to the event. The change of the active scan code map may include decoupling a visual code layer and the scan code layer. The tangible, non-transitory, computer readable storage medium includes code to generate a scan code layer at runtime based on the context information. The runtime configurable display may be located on a configurable keyboard. The tangible, non-transitory, computer readable storage medium includes code to report the runtime configurable display to an application.

Example 4

A method for displaying a runtime configurable display is described herein. The method includes a means for inputting context information, a means for detecting the context information using a scan matrix, a means for generating a scan code layer based on the content information, a means for determining the context information corresponds to an event, a means for notifying a layout change transmitter of the event, and a means for displaying the context information on the runtime configurable display.

The method includes a means for assigning a default table that corresponds to a lower case alphabet layout. The method includes a means for sending the context information to a keyboard module. The event may include a change of the keyboard module. The method includes a means for changing an active scan code map. The active scan code map may be changed when the context information corresponds to the event. The change of the active scan code map may include decoupling a visual code layer and the scan code layer. The method may include a means for generating a scan code layer at runtime based on the context information. The runtime configurable display may be located on a configurable keyboard. The method may include a means for reporting the runtime configurable display to an application.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for displaying a runtime configurable display, comprising:
    receiving context information from a keyboard based on keypresses detected by the keyboard;
    determining that the context information corresponds to a password entry event;
    notifying a layout change transmitter of the password entry event;
    associating a new scan code layer with a visual layer of the keyboard based on the determining, wherein the context information is generated using the new scan code layer; and
    receiving a password through keypresses at the keyboard, wherein each keypress generates a character that corresponds with the new scan code layer and differs from a visual representation of the character generated by the visual layer of the keyboard.

2. The method of claim 1, comprising displaying the context information on the keyboard.

3. The method of claim 1, wherein associating a new scan code layer with a visual layer of the keyboard comprises changing an active scan code map associated with the keyboard.

4. The method of claim 3, wherein the change of the active scan code map comprises decoupling a visual code layer and the scan code layer.

5. A tangible, non-transitory, computer readable storage medium comprising code to direct a processor to:
    receive context information from a keyboard based on keypresses detected by the keyboard;
    determine that the context information corresponds to a password entry event;
    notify a layout change transmitter of the password entry event;
    associate a new scan code layer with a visual layer of the keyboard based on the determining, wherein the context information is generated using the new scan code layer; and
    receive a password through keypresses at the keyboard, wherein each keypress generates a character that corresponds with the new scan code layer and differs from a visual representation of the character generated by the visual layer of the keyboard.

6. The non-transitory, computer readable storage medium of claim 5, comprising code to direct the processor to display the context information on the keyboard.

7. The non-transitory, computer readable storage medium of claim 5, comprising the code to direct the processor to associate a new scan code layer with a visual layer of the keyboard comprises code to change an active scan code map associated with the keyboard.

8. The non-transitory, computer readable storage medium of claim 7, wherein the change of the active scan code map comprises decoupling a visual code layer and the scan code layer.

9. A computing device, comprising:
    a keyboard monitor; and
    password service configured to:
    receive context information from the keyboard monitor based on keypresses detected by the keyboard monitor;
    determine that the context information corresponds to a password entry event;
    notify a layout change transmitter of the password entry event;
    associate a new scan code layer with a visual layer of the keyboard based on the determining, wherein the context information is generated using the new scan code layer; and
    receive a password through keypresses at the keyboard, wherein each keypress generates a character that corresponds with the new scan code layer and differs from a visual representation of the character generated by the visual layer of the keyboard.

10. The computing device of claim 9, comprising a display manager to display the context information on the keyboard.

11. The computing device of claim 9, wherein associating a new scan code layer with a visual layer of the keyboard comprises changing an active scan code map associated with the keyboard.

12. The computing device of claim 11, wherein the change of the active scan code map comprises decoupling a visual code layer and the scan code layer.

* * * * *